United States Patent
Boddakayala et al.

(10) Patent No.: US 12,482,880 B2
(45) Date of Patent: Nov. 25, 2025

(54) BATTERY PACK ASSEMBLY HAVING A THERMAL BARRIER AND METHOD OF THERMAL CONTROL WITHIN A BATTERY PACK

(71) Applicant: Ford Global Technologies, LLC, Dearborn, MI (US)

(72) Inventors: Bhaskara Rao Boddakayala, Troy, MI (US); Brian Utley, Canton, MI (US); James Lawrence Swoish, Northville, MI (US); Thomas Edward Smith, Livonia, MI (US); Nihar Kotak, Ashburn, VA (US)

(73) Assignee: Ford Global Technologies, LLC, Dearborn, MI (US)

( * ) Notice: Subject to any disclaimer, the term of this patent is extended or adjusted under 35 U.S.C. 154(b) by 727 days.

(21) Appl. No.: 17/845,077

(22) Filed: Jun. 21, 2022

(65) Prior Publication Data

US 2023/0411736 A1   Dec. 21, 2023

(51) Int. Cl.
*H01M 10/658* (2014.01)
*H01M 50/204* (2021.01)
*H01M 50/262* (2021.01)
*H01M 50/271* (2021.01)
*H01M 50/293* (2021.01)

(52) U.S. Cl.
CPC ....... *H01M 10/658* (2015.04); *H01M 50/204* (2021.01); *H01M 50/262* (2021.01); *H01M 50/271* (2021.01); *H01M 50/293* (2021.01)

(58) Field of Classification Search
CPC ............. H01M 10/658; H01M 50/204; H01M 50/262; H01M 50/271; H01M 50/293
See application file for complete search history.

(56) References Cited

U.S. PATENT DOCUMENTS

| | | | |
|---|---|---|---|
| 7,326,458 B1 | 2/2008 | Zagorski | |
| 2010/0068471 A1 | 3/2010 | Lubart et al. | |
| 2018/0033949 A1 | 2/2018 | Rastegar et al. | |
| 2021/0376405 A1* | 12/2021 | Browning et al. | H01M 10/658 |
| 2022/0251749 A1* | 8/2022 | Borchardt et al. | H01M 50/293 |

FOREIGN PATENT DOCUMENTS

| | | |
|---|---|---|
| CN | 106450569 A | 2/2017 |
| CN | 210652703 U | 6/2020 |
| WO | 202083331 A1 | 4/2020 |

OTHER PUBLICATIONS

"Fastener Search Results", Apr. 20, 2021, Avery Dennison, <https://www.fastener.averydennison.com/en/home/product-selector/product-selector-swf.html> (Year: 2021).*

* cited by examiner

*Primary Examiner* — Matthew T Martin
*Assistant Examiner* — Alexandra J Simmons
(74) *Attorney, Agent, or Firm* — David B. Kelley; Carlson, Gaskey & Olds, P.C.

(57) ABSTRACT

A battery pack assembly includes a first battery array, a second battery array adjacent the first battery array, and a thermal barrier assembly that blocks transfer of thermal energy between the first battery array and the second battery array. The thermal barrier assembly having a sheet of material that is folded to provide a plurality of layers.

20 Claims, 3 Drawing Sheets

BATTERY PACK ASSEMBLY HAVING A THERMAL BARRIER AND METHOD OF THERMAL CONTROL WITHIN A BATTERY PACK

TECHNICAL FIELD

This disclosure relates generally to a thermal barrier assembly and, more particularly, to a thermal barrier assembly that includes a folded sheet of material.

BACKGROUND

A battery pack of an electrified vehicle can include groups of battery cells arranged in one or more battery arrays. Busbars can be used to distribute electrical power to and from the battery cells, and to and from the battery pack. From time to time, thermal energy in one or more of the battery arrays can increase.

SUMMARY

In some aspects, the techniques described herein relate to a battery pack assembly, including: a first battery array; a second battery array adjacent the first battery array; and a thermal barrier assembly that blocks transfer of thermal energy between the first battery array and the second battery array, the thermal barrier assembly having a sheet of material that is folded to provide a plurality of layers.

In some aspects, the techniques described herein relate to a battery pack assembly, wherein the sheet of material includes felt.

In some aspects, the techniques described herein relate to a battery pack assembly, wherein the sheet of material includes oxidized polyacrylonitrile fibers.

In some aspects, the techniques described herein relate to a battery pack assembly, wherein the sheet of material is accordion folded.

In some aspects, the techniques described herein relate to a battery pack assembly, wherein the plurality of layers includes more than two layers.

In some aspects, the techniques described herein relate to a battery pack assembly, wherein some of the plurality of layers are undersized relative other layers of the plurality of layers to provide a notch within the thermal barrier assembly, the notch configured to accommodate a component of a battery pack.

In some aspects, the techniques described herein relate to a battery pack assembly, further including at least one fastener that extends through the plurality of layers.

In some aspects, the techniques described herein relate to a battery pack assembly, wherein the at least one fastener is a tag fastener.

In some aspects, the techniques described herein relate to a battery pack assembly, wherein the at least one fastener has an "I" shape.

In some aspects, the techniques described herein relate to a battery pack assembly, further including an enclosure housing the first battery array, the second battery array, and the thermal barrier assembly.

In some aspects, the techniques described herein relate to a battery pack assembly, wherein the thermal barrier assembly is compressed by a portion of the enclosure.

In some aspects, the techniques described herein relate to a battery pack assembly, wherein the portion that compresses the thermal barrier assembly is a cover of the thermal barrier assembly.

In some aspects, the techniques described herein relate to a method of reducing thermal energy transfer within a battery pack, including; folding a sheet of material to provide a thermal barrier assembly having a plurality of layers; and positioning the thermal barrier assembly within a battery pack between a first battery array and a second battery array of the battery pack.

In some aspects, the techniques described herein relate to a method, further including holding together the plurality of layers using a fastener.

In some aspects, the techniques described herein relate to a method, wherein the fastener is a tag-style fastener.

In some aspects, the techniques described herein relate to a method, wherein the positioning includes positioning between the first battery array and the second battery array.

In some aspects, the techniques described herein relate to a method, wherein the folding includes accordion folding the sheet of material.

In some aspects, the techniques described herein relate to a method, further including compressing the thermal barrier assembly after the positioning.

In some aspects, the techniques described herein relate to a method, further including compressing using a portion an enclosure that houses the first battery array, the second battery array, and the thermal barrier assembly.

In some aspects, the techniques described herein relate to a method, further including nesting a component of the battery pack within a notch of the thermal barrier assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A typical traction battery pack includes an enclosure having an interior. Battery arrays and other components are held within the interior.

A thermal event can cascade from one battery array of the battery pack to another battery array of the battery pack. This disclosure details exemplary thermal barrier assemblies and methods that can reduce the likelihood of such a cascade.

Figure 1:
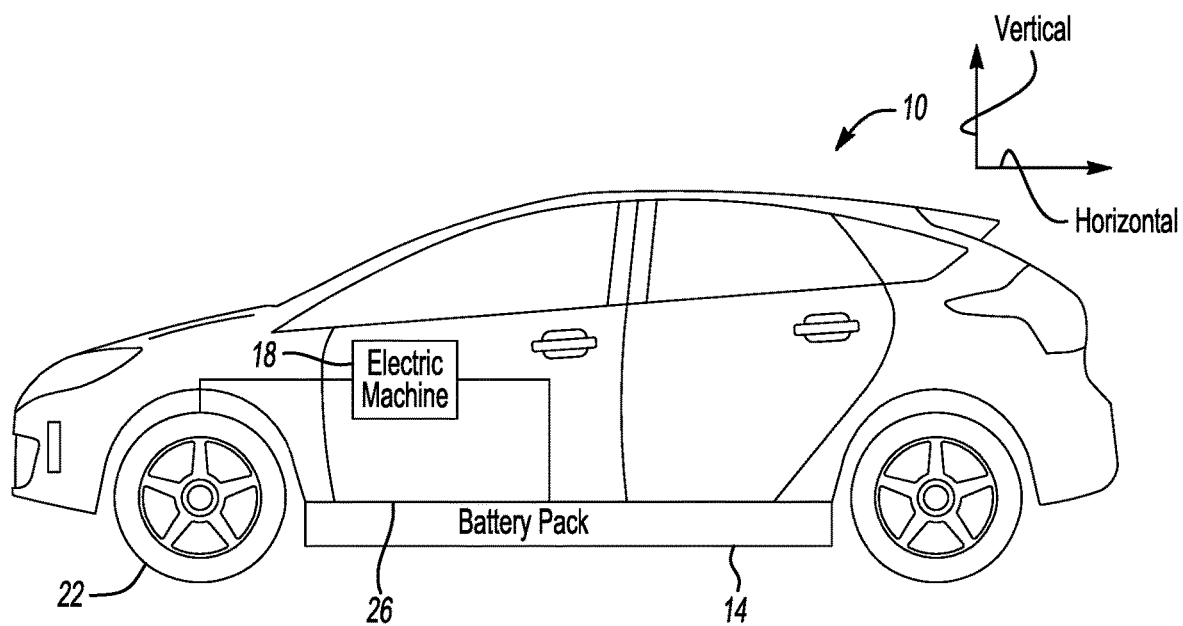
FIG. 1 illustrates a side view of an electrified vehicle having a battery pack.

With reference to FIG. 1, an electrified vehicle 10 includes a traction battery pack 14 and an electric machine 18, and wheels 22. The battery pack 14 powers an electric machine 18, which converts electric power to torque to drive the wheels 22.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead, or in addition to, an electric machine. Generally, the electrified vehicle 10 could be any type of vehicle having a traction battery pack.

Figure 2:
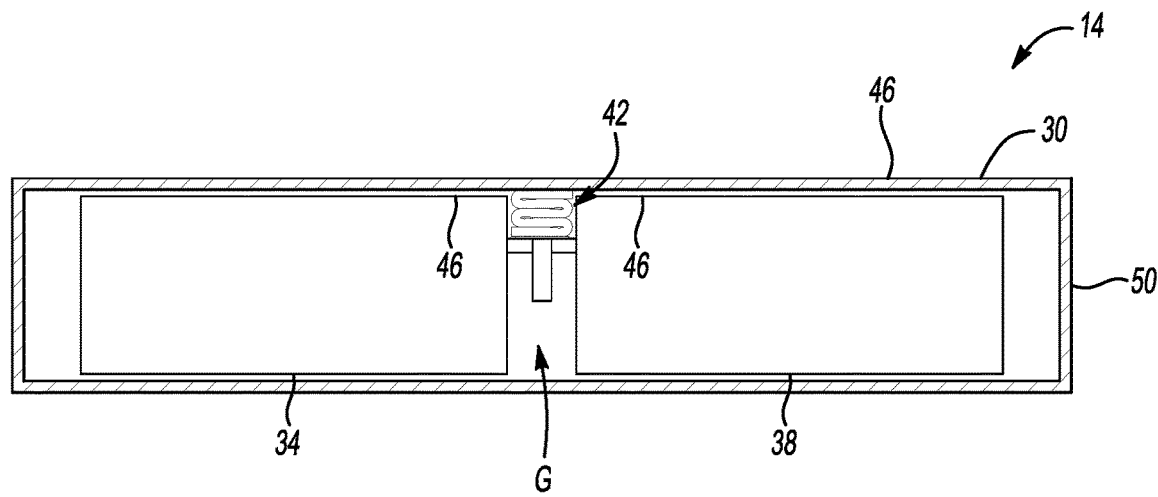
FIG. 2 is a schematic side view of the battery pack of FIG. 1 with portions cut-away to show a thermal barrier assembly according to an exemplary aspect of the present disclosure.

Referring now to FIG. 2, with continuing reference to FIG. 1, the battery pack 14 includes an enclosure 30 that houses, among other things, at least a first battery array 34, a second battery array 38, and a thermal barrier assembly 42.

The first battery array 34 is disposed horizontally adjacent to, but spaced a distance from, the second battery array 38 to provide a gap G between the first battery array 34 and the second battery array 38. Vertical and horizontal are, for purposes of this disclosure, with reference to ground and a general orientation of the electrified vehicle 10 and battery pack 14 during operation.

The thermal barrier assembly 42 is disposed at least partially within the gap G. When installed as shown, the thermal barrier assembly 42 is compressed by a portion of the enclosure 30. In this example, the thermal barrier assembly 42 is compressed by a cover 46 of the enclosure 30. The cover 46 is secured to a tray 50 of the enclosure 30.

The thermal barrier assembly 42 can help to block a transfer of thermal energy between the first battery array 34 and the second battery array 38. In particular, the thermal barrier assembly 42 can help to discourage a thermal event within one or more of the battery cells in the first battery array 34 from cascading to the second battery array 38, and vice versa.

Figure 3:
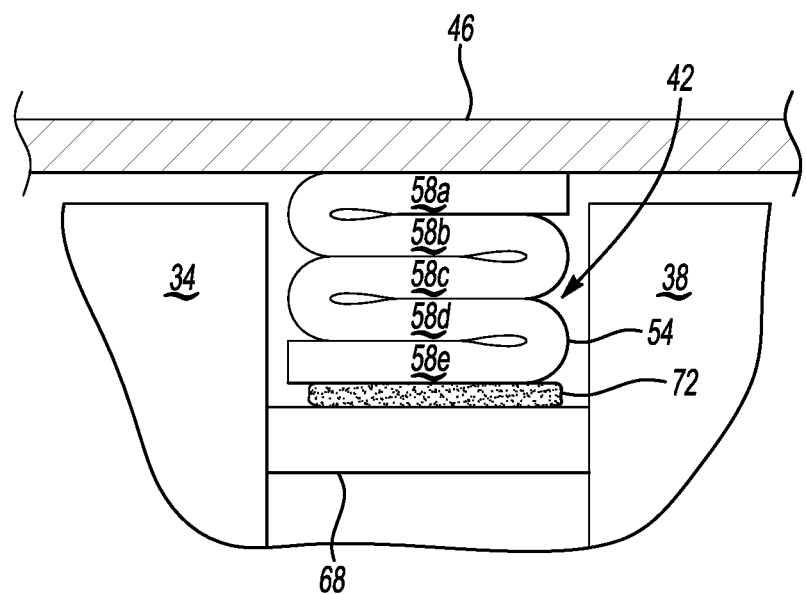
FIG. 3 is a close-up of a portion of FIG. 2 showing the thermal barrier assembly and surrounding areas of the battery pack.
Figure 4:
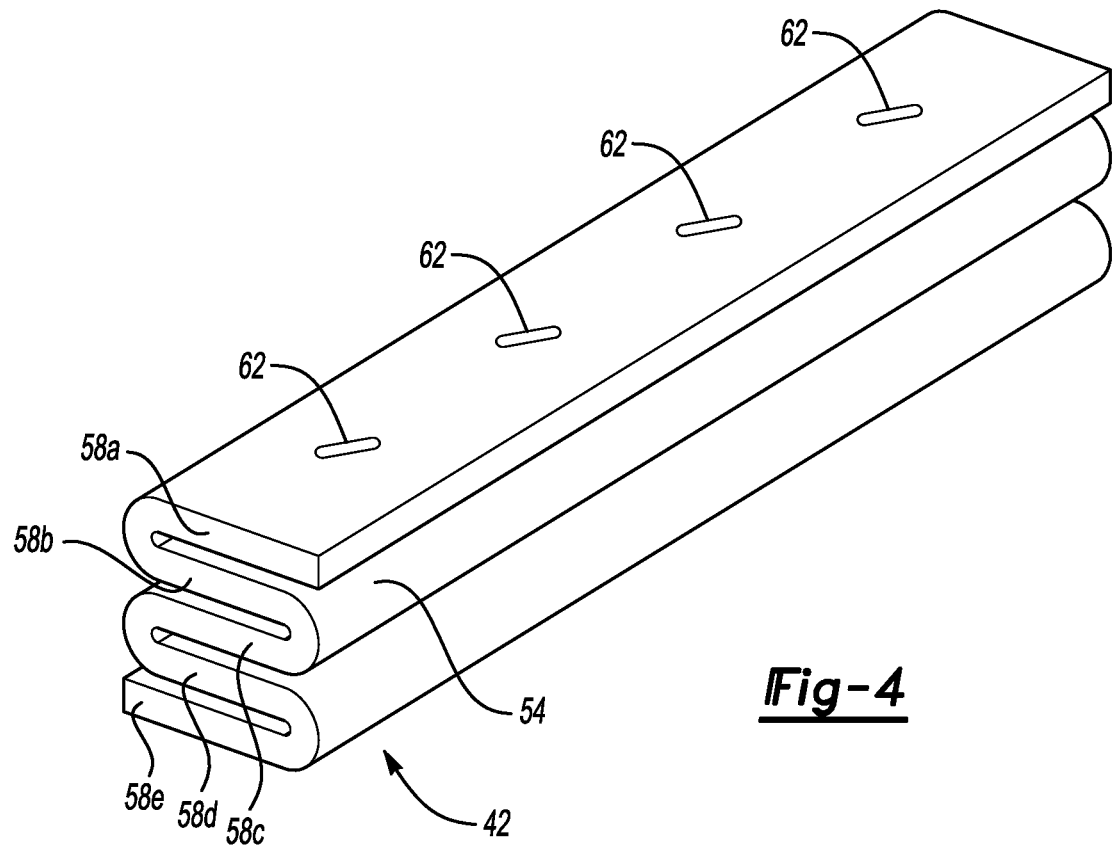
FIG. 4 is a perspective view of the thermal barrier assembly of FIG. 3.

With reference to FIGS. 3 and 4, the thermal barrier assembly 42, in the exemplary embodiment, includes a sheet of material 54 that is folded to provide a plurality of layers 58a-58e of material 54. The example sheet of material 54 is folded to provide five layers. In other examples, the number of layers could be from two to four layers, or more than six layers.

In the exemplary embodiment, the material 54 is a felt material, which can include oxidized polyacrylonitrile fibers, for example. The sheet of material 54 can be made by matting, condensing, and pressing together the oxidized polyacrylonitrile fibers.

To establish the layers 58a-58e, the sheet of material 54 is accordion folded, as shown. Using folds to establish the layers 58a-58e rather than, for example, stacking separate and distinct pieces of material, can help to prevent gas from moving through the thermal barrier assembly 42 between the layers 58a-58e. If the layers 58a-58e were separate from each other, there could be passageways through the thermal barrier assembly 42.

A plurality of fasteners 62 are used to hold together the layers 58a-58e. The fasteners 62 extend though the layers 58a-58e. The fasteners 62 are "I-shaped" tag-style fasteners in this example. In another example, the fasteners 62 are retention staples.

Figure 5:
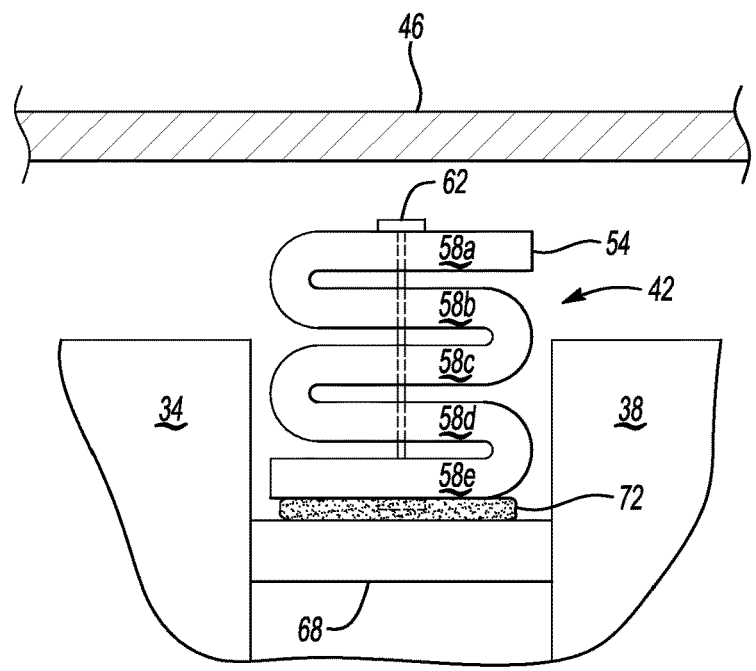
FIG. 5 illustrates the area of FIG. 4 during assembly of the battery pack.

The fasteners 62 can be a polymer-based material, such as nylon. The fasteners 62 loosely hold, but hold and maintain folds of the material 54 during installation as shown in FIG. 5. As the cover 36 is moved to the installed position, the layers 58a-58e are compressed.

When assembled within the battery pack 14, the thermal barrier assembly 42 can be supported on a bracket 68 within the gap G. An adhesive 72 can secure the thermal barrier assembly 42 to the bracket 58. The cover 46 compresses the layers 58a-58e together to sandwich the layers 58a-58e between the cover 46 and the bracket 68. When compressed, the layers 58a-58e are substantially parallel to each other.

The layers 58a-58e are similarly sized in this example. In another example, some of the layers 58a-58e are sized differently than other layers 58a-58e. This can facilitate accommodating a component of the battery pack 14.

Figure 6:
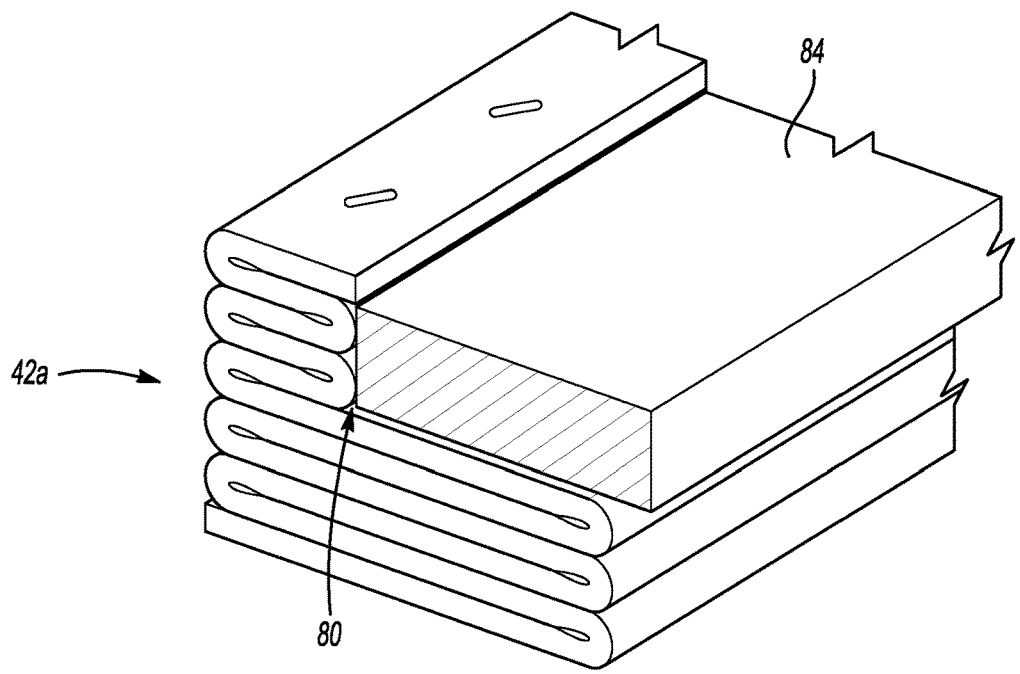
FIG. 6 illustrates a perspective view of a thermal barrier assembly according to another exemplary embodiment of the present disclosure.

For example, with reference to the thermal barrier assembly 42a of FIG. 6, a few of the layers can be undersized (e.g., reduced in width) relative to other layers to provide a notch 80 that can allow a component such as a busbar assembly 84 to be nested against the thermal barrier assembly 42. The different sized layers can be incorporated to accommodate components other than the busbars in other examples.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack assembly, comprising:
   a first battery array;
   a second battery array adjacent the first battery array; and
   a thermal barrier assembly that blocks transfer of thermal energy between the first battery array and the second battery array, the thermal barrier assembly having a sheet of material that is folded to provide a plurality of layers, wherein some of the plurality of layers are undersized relative other layers of the plurality of layers to provide a notch within the thermal barrier assembly, the notch configured to accommodate a component of a battery pack.

2. The battery pack assembly of claim 1, wherein the sheet of material comprises felt.

3. The battery pack assembly of claim 1, wherein the sheet of material comprises oxidized polyacrylonitrile fibers.

4. The battery pack assembly of claim 1, wherein the sheet of material is accordion folded.

5. The battery pack assembly of claim 1, wherein the plurality of layers comprises more than two layers.

6. The battery pack assembly of claim 1, further comprising at least one fastener that extends through the plurality of layers.

7. The battery pack assembly of claim 6, wherein the at least one fastener is a tag fastener.

8. The battery pack assembly of claim 7, wherein the at least one fastener has an "I" shape.

9. The battery pack assembly of claim 1, further comprising an enclosure housing the first battery array, the second battery array, and the thermal barrier assembly.

10. The battery pack assembly of claim 9, wherein the thermal barrier assembly is compressed by a portion of the enclosure.

11. The battery pack assembly of claim 10, wherein the portion that compresses the thermal barrier assembly is a cover of the thermal barrier assembly.

12. The battery pack assembly of claim 1, wherein the component is a busbar.

13. A battery pack assembly, comprising:
a first battery array;
a second battery array adjacent the first battery array; and
a thermal barrier assembly that blocks transfer of thermal energy between the first battery array and the second battery array, the thermal barrier assembly having a sheet of material that is folded to provide a plurality of layers, wherein at least one of the plurality of layers is undersized relative to other layers to define a recess, the recess configured to receive a component of a battery pack.

14. The battery pack assembly of claim 13, wherein the component is a busbar assembly extending between the first battery array and the second battery array.

15. The battery pack assembly of claim 13, wherein the sheet of material comprises oxidized polyacrylonitrile fibers.

16. The battery pack assembly of claim 13, wherein the thermal barrier assembly is compressed by a portion of an enclosure that houses the thermal battery assembly, the first battery array, and the second battery array.

17. A battery pack assembly comprising:
a first battery array;
a second battery array adjacent to the first battery array; and
a thermal barrier assembly disposed between the first battery array and the second battery array, the thermal barrier assembly comprising a sheet of material folded to define a plurality of layers,
wherein at least one of the plurality of layers is offset from at least one other layer in the plurality of layers to define a notch, the notch configured to nest a battery pack component such that the component is at least partially surrounded by the plurality of layers of the thermal barrier assembly.

18. The battery pack assembly of claim 13, wherein the component is a busbar assembly extending between the first battery array and the second battery array.

19. The battery pack assembly of claim 13, wherein the sheet of material comprises oxidized polyacrylonitrile fibers.

20. The battery pack assembly of claim 13, wherein the thermal barrier assembly is compressed by a portion of an enclosure that houses the thermal battery assembly, the first battery array, and the second battery array.

\* \* \* \* \*